Figure 1:
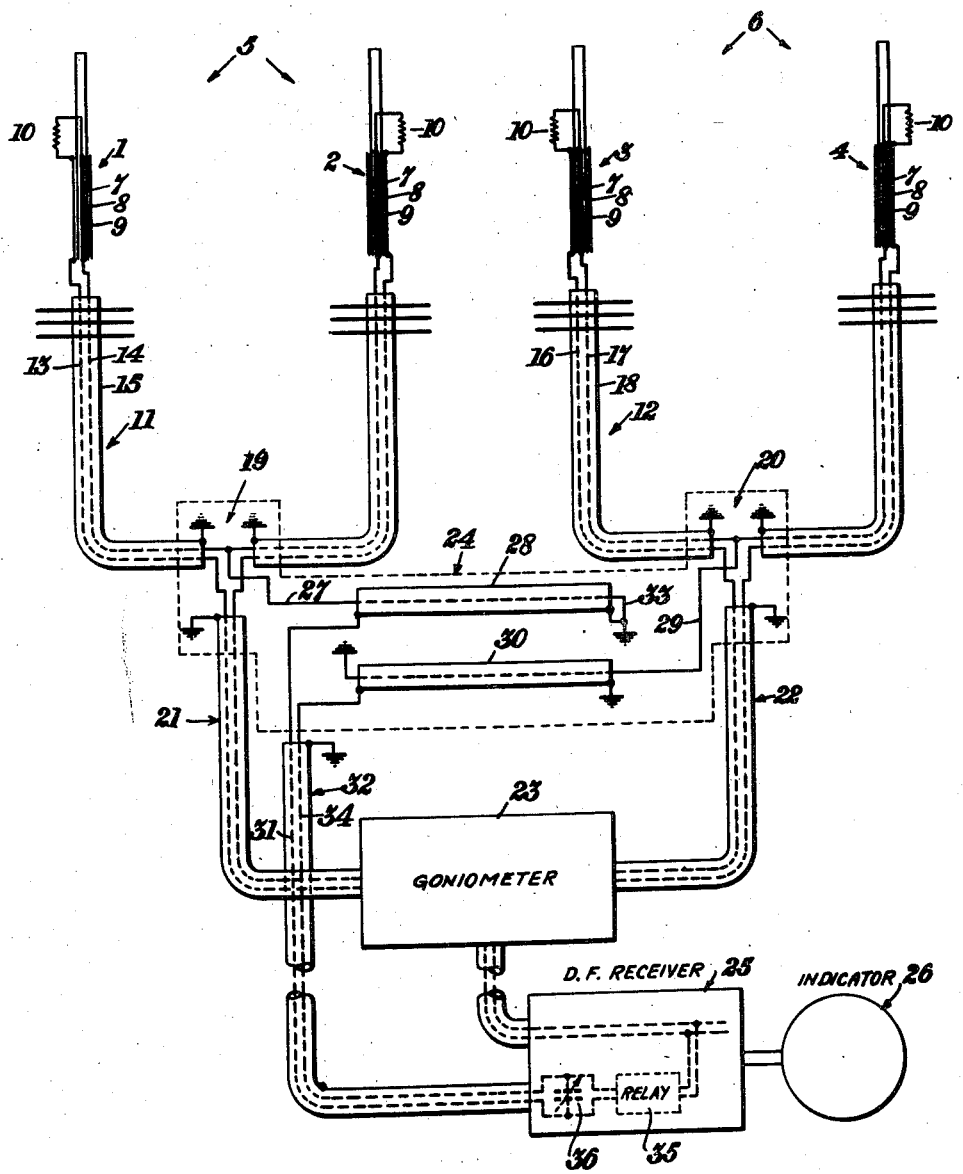

Dec. 28, 1948.   F. O. CHESUS ET AL   2,457,126
ANTENNA SYSTEM
Filed July 31, 1945   2 Sheets-Sheet 1

INVENTORS.
FRANK O. CHESUS
FRANK G. THOMAS
BY
Percy P. Lantry
ATTORNEY

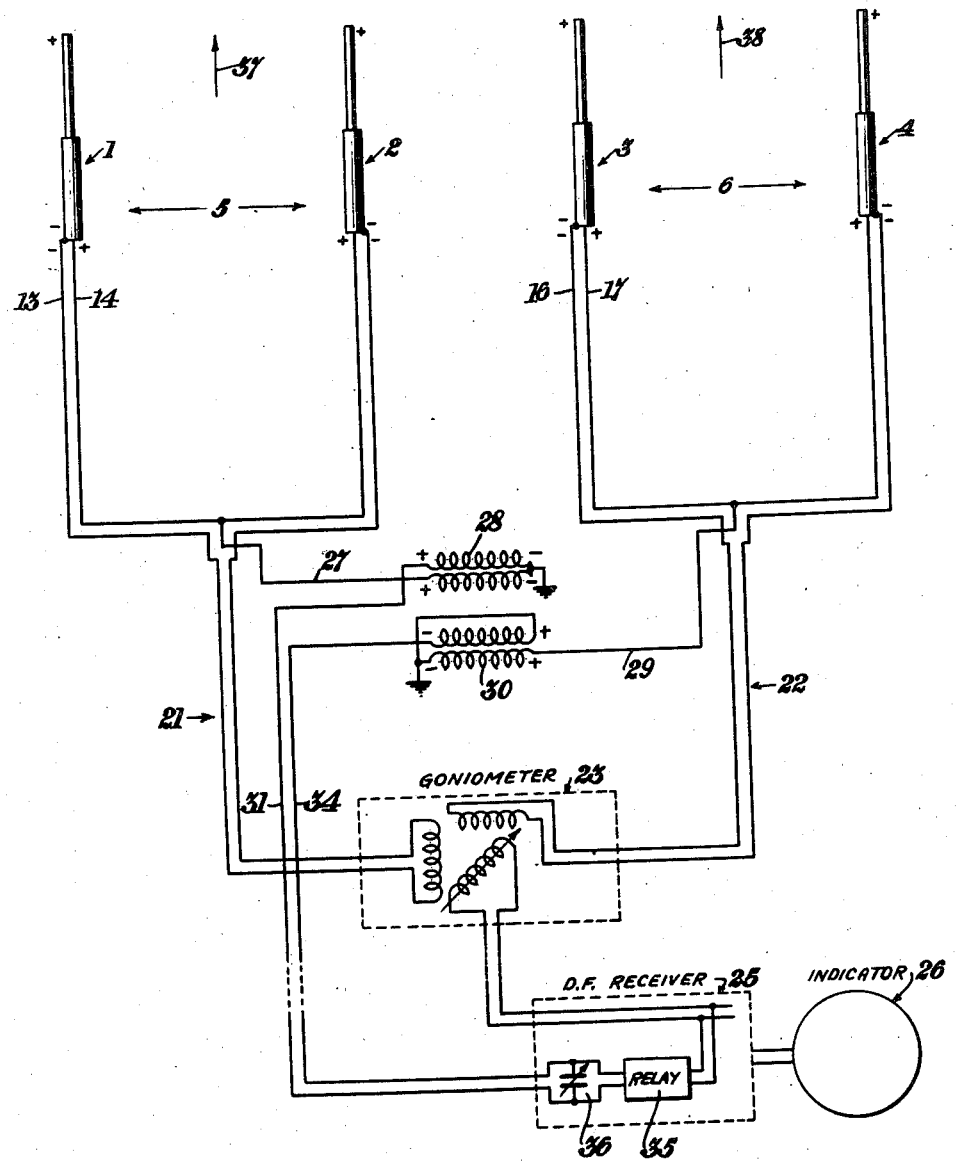

Patented Dec. 28, 1948

2,457,126

UNITED STATES PATENT OFFICE 2,457,126

ANTENNA SYSTEM

Frank O. Chesus, Jackson Heights, and Frank G. Thomas, Islip, N. Y., assignors to Federal Telephone and Radio Corporation, New York, N. Y., a corporation of Delaware Application July 31, 1945, Serial No. 608,046

9 Claims. (Cl. 343—115)

1

The present invention relates to antenna systems, and particularly to those adapted for use with direction finders.

In antenna systems for portable direction finders, particularly those carried on airplanes, certain special conditions must be met: the desiderata for such collector systems include light weight and small volume (to lessen wind resistance). While some means for indicating sense is required, the use of sensing antennas and coupling arrangements therefor add materially to both the weight and volume of the antenna system.

An object of the present invention is the provision of a novel antenna system particularly one adapted for direction finding applications and characterized by relatively light weight and small volume.

Another object of the present invention is the provision of an Adcock type direction finding antenna system which dispenses with the use of an extra antenna for sense indication and therefore avoids any coupling arrangements for said extra antenna.

In accordance with our invention the Adcock array is used in a somewhat conventional manner for obtaining a line of direction. To obtain a sense indication, however, the voltages induced in the antenna units of the antenna system, which voltages are taken with respect to ground are algebraically added, and thereby an omnidirectional pattern is produced which is combined with the crossed figure-of-eight pattern of the usual Adcock array to produce sensing indications.

According to one aspect of our invention, the Adcock array is balanced with respect to ground for direction finding purposes. However, when utilizing all of the antenna units of the Adcock array for sensing purposes, the voltage taken from these units is unbalanced with respect to ground.

A still further object of the present invention is the provision, in an Adcock array, of a sensing arrangement making use of the direction finder antenna units in which the output of the sensing arrangement is balanced with respect to ground.

Other and further objects of the present invention will become apparent and the invention will be best understood from the following description of an embodiment thereof, reference being had to the drawings, in which:

Fig. 1 is a schematic and block diagram of a direction finder embodying our invention; and

2

Fig. 2 is a theoretical drawing used in explaining the operation of the direction finder of Fig. 1.

Referring now to the embodiment of our invention illustrated in Fig. 1, the antenna system includes four spaced vertical antenna units 1–4, in the form of dipoles, separated into two pairs 5 and 6 of interconnected units, pair 5 consisting of units 1 and 2 and pair 6 consisting of units 3 and 4. While the pairs are illustrated as separated in Figs. 1 and 2 for the purpose of more clearly showing the connections of the system, in actual practice, the pairs are crossed at right angles to each other so that the dipoles are symmetrically disposed around a central axis and are equi-distant from said central axis and from each other, to produce a crossed figure-of-eight reception diagram.

For the antenna units, it is preferred, to use balanced antennas having a substantially omnidirectional radiation pattern, as for example, the type of dipole described in the copending application, F. O. Chesus, for "Direction finder," Serial No. 613,329, filed August 29, 1945, now Patent No. 2,454,774, granted November 30, 1948. Each of the antenna units 1–4 consists of three cylindrical conductors coaxially arranged: an inner conductor 7, an intermediate conductor 8, and an outer conductor 9. The intermediate conductor 8 extends beyond conductors 7 and 9 and may be twice as long as they are. The top of the inner conductor 7 is connected by a resistance 10 to the outer surface of the outer conductor 9 adjacent the top thereof. The value of resistance 10 is chosen in relation to the other parameters of the antenna system so that the usual requirements, such as impedance matching, are satisfied. The radiating surfaces of this unit include the outer surface of outer conductor 9 and the exposed portion of intermediate conductor 8. This unit is characterized by small volume, light weight and operates satisfactorily over a relatively wide band of frequencies.

Antenna units 1 and 2 are cross-connected by a shielded dual transmission line 11 and antenna units 3 and 4 are cross-connected by a shielded dual transmission line 12, each of said lines 11 and 12 being substantially in the form of a U, the sides of which are substantially vertical and the bottom portion of which is substantially horizontal. Line 11 includes inner conductors 13 and 14 and outer shield 15, while line 12 includes inner conductors 16 and 17 and outer shield 18.

Transmission lines 11 and 12 are connected to the lower ends of the antenna units 1–4 as follows:

Inner conductor 14 connects together the inner conductors 7 of antenna units 1 and 2 while inner conductor 17 connects together the inner conductors 7 of antenna units 3 and 4. The ends of inner conductors 13 and 16 are connected to the outside of the outer conductors 9 of antenna units 1 and 2, and 3 and 4 respectively, conductors 13 and 16 being open as indicated at 19 and 20 respectively, the loose ends being connected through shielded dual transmission lines 21 and 22 respectively to a goniometer 23 of any suitable type. To enable making these connections, metallic shields 15 and 18 are broken away adjacent portions 19 and 20, which are the midpoints of the horizontal sections of the transmission lines 11 and 12 respectively and these portions are enclosed within a metallic junction box shown in broken lines and designated by the numeral 24, the shields of transmission lines 11 and 12, as well as 21 and 22, being grounded to said junction box.

The output of goniometer 23, is fed to a direction finding receiver 25 whose output is fed to an indicator 26 which may be a cathode ray oscillograph tube arrangement. This arrangement is adapted to give a line of direction indication, but there is an 180° ambiguity which requires some sensing arrangement for its correction.

In accordance with our invention, the same antenna units 1-4 are also used for sensing purposes. Furthermore, in accordance with our invention, these antenna units are so interconnected that the output for sensing purposes is balanced with respect to ground. In accomplishing this, the midpoint of inner conductor 14 of line 11 is connected by conductor 27 to a transmission line transformer 28 while the midpoint of inner conductor 17 of line 12 is connected by conductor 29 to another transmission line transformer 30.

Transformers 28 and 30 may be in the form of short lengths of coaxial cable, substantially less than a quarter wavelength at the mean operating frequency, which are housed within junction box 24. Conductor 27 is connected to the inner conductor of coaxial cable 28 at one end thereof, the outer conductor of said cable 28 being connected at the same end to a conductor 31 forming part of a shielded dual transmission line 32 connected to the receiver 25. At the opposite end of cable 28, the inner conductor and the outer conductor thereof are connected together and to ground as indicated at 33. In order to provide for a balanced-to-ground output, from the sensing arrangement to the direction finding receiver, transformer or cable 30 serves as a phase inverter. For this purpose conductor 29 is connected to one end of the inner conductor of cable 30, the outer conductor at said end being connected to ground, and at the opposite end the inner conductor is connected to ground whereas the outer conductor is connected to an output conductor 34 forming part of the dual shielded transmission line 32. The impedance of transformers 28 and 30 should preferably be the same in order that the system may be balanced. Within the direction finding receiver 25, the output of conductors 31 and 34 may be combined through a relay 35 with the output of the goniometer 23 so as to produce a sensing indication in the indicator 26. When sensing is not required, the relay is open in order that the line of direction may be more readily determined. The length of the shielded transmission line 32 is preferably such as to produce the required 90° phase shift between the energy derived from the goniometer and the energy from said line 32. In order to adjust the balance of the arrangement, a variable condenser 36 may be arranged across the conductors 33 and 34.

Referring now to the theoretical diagram of Fig. 2, and assuming that a wave transverse to the plane of antenna units 1 and 2 and having a field indicated by the arrow 37 strikes both antenna units simultaneously, the tops of each unit will tend to be positive at a given instant and the bottoms negative with respect thereto. At such instant therefore, with conductor 14 connecting the positive sides of the antenna units 1 and 2 together, the negative voltages thereof oppose each other through transmission line 21 in the goniometer. Consequently it will be seen that the goniometer receives the difference between the voltages induced in antenna units 1 and 2 in relation to their opposite poles. With the field described, the difference between these voltages will be zero while the difference between the voltages induced in antenna units 3 and 4 will have some finite value. On the other hand, assuming that a wave transverse to the plane of antenna units 3 and 4 and having a field indicated by the arrow 38 strikes antenna units 3 and 4 simultaneously, the difference between the voltages induced in antenna units 3 and 4 is applied over lines 22 to the goniometer. With the wave transverse to units 3 and 4, this difference will equal zero. The difference between the voltages induced in antenna units 1 and 2 under these conditions, will have a finite value.

In the goniometer and the direction finding receiver, the difference voltages derived from antenna units 1-4 are compared to obtain a directional indication in the indicator 26. For sensing purposes, however, the algebraic sum of the voltages in units 1 and 2 with respect to ground are taken by line 27 and applied to transformer 28. Likewise the algebraic sum of the voltages induced in antenna units 3 and 4 with respect to ground, are taken over conductor 29 and applied to transformer 30. In transformer 30 the voltages carried by conductor 29 from antenna units 3 and 4 are inverted with respect to ground whereas in transformer 28 they are not. Consequently lines 31 and 34 carry the sensing voltages derived from antenna units 1-4 in a balanced-to-ground system. Since the directional indications are likewise maintained balanced-to-ground, the sensing and directional energy can be combined in the receiver.

While we have shown the specific details of a direction finder embodying our invention, it will be apparent to those versed in the art that numerous changes may be made in these details without departing from the teachings of our invention. For example, conventional type dipoles or other balanced antennas may be used instead of those hereindescribed. Other types of transformers other than those illustrated may be employed and as a matter of fact, the transformers may be dispensed with and any suitable known phase inverting means utilized to produce the balanced-to-ground sensing output. Accordingly, while we have described above the principles of our invention in connection with specific apparatus, it is to be clearly understood that this description is made only by way of example and not as a limitation on the scope of our invention as defined in the accompanying claims.

We claim:

1. A direction finder comprising two separate cross-connected pairs of spaced antenna units, means taking the difference between the voltages induced in the units of one pair, means taking the difference between the voltages induced in the units of the other pair, means comparing said differences to produce a directional indication, and a sensing arrangement including means taking the algebraic sum of the voltages induced in all of said units.

2. A direction finder comprising two cross-connected pairs of spaced antenna units, means taking the difference, balanced as to ground, between the voltages induced in the units of one pair, means taking the difference, balanced as to ground, between the voltages induced in the units of the other pair, means comparing said differences to produce a directional indication, and a sensing arrangement including means taking the algebraic sums of the voltages induced in said units with respect to ground and converting them into balanced-to-ground voltages.

3. A direction finder comprising two cross-connected pairs of spaced antenna units, means taking the difference, balanced as to ground, between the voltages induced in the units of one pair, means taking the difference, balanced as to ground, between the voltages induced in the units of the other pair, means comparing said differences to produce a directional indication, and a sensing arrangement comprising means taking the algebraic sums of the voltages induced in said pairs with respect to ground, said last-mentioned means including means for inverting the phase of the voltages derived from one of said pairs with respect to ground to provide balanced-to-ground voltages from both pairs, and means for combining said balanced-to-ground voltages with the difference voltages in the comparison means.

4. A direction finder comprising two separate cross-connected pairs of spaced vertical antenna units symmetrically disposed around a central axis, means taking the difference between the voltages induced in the units of one pair, means taking the difference between the voltages induced in the units of the other pair, means comparing said differences to produce a directional indication, and a sensing arrangement including means taking the algebraic sum of the voltages induced in all of said units.

5. A direction finder comprising two cross-connected pairs of spaced vertical antenna units symmetrically disposed around a central axis, means taking the difference between the voltages induced in the units of one pair, means taking the difference between the voltages induced in the antenna units of the other pair, means for comparing said differences to produce a directional indication, said difference voltages being balanced with respect to ground in the comparison means, and a sensing arrangement including means taking the algebraic sum of the voltages induced in all of said antenna units with respect to ground, means for balancing said algebraic sum voltages with respect to ground, and means for combining said algebraic sum voltages with the difference voltages in the comparison means.

6. A direction finder comprising a pair of spaced vertical dipoles, means taking the difference between the voltages, induced in one of the poles with respect to the other pole of one dipole of the pair, and the like voltages of the other dipole of said pair, means responsive to said difference to produce a directional indication, and a sensing arrangement including means taking the algebraic sums of voltages induced in said dipoles with respect to ground.

7. A direction finder comprising two cross-connecting pairs of spaced vertical dipoles symmetrically disposed around a central axis, means taking the difference between the voltages, induced in one of the poles with respect to the other pole of one dipole of each pair, and the like voltage of the other dipole of said pair, means comparing said differences to produce a directional indication, and a sensing arrangement including means taking the algebraic sum of the voltages induced in all of said dipoles with respect to ground.

8. A direction finder comprising two cross-connecting pairs of spaced vertical dipoles symmetrically disposed around a central axis, means taking the difference between the voltage, induced in one of the poles with respect to the other pole of one dipole of each pair, and the like voltage of the other dipole of said pair, the output of said means being balanced with respect to ground, means comparing said differences to produce a directional indication, and a sensing arrangement including means taking the algebraic sum of the voltages induced in one pair of said dipoles with respect to ground and the algebraic sum of the voltage induced in the other pair of said dipoles with respect to ground, and means for inverting with respect to ground the phase of said algebraic sum of voltages from said one pair of dipoles to, thereby produce an output for sensing purposes from both pairs of dipoles which is balanced with respect to ground.

9. A direction finder comprising two cross-connecting pairs of spaced vertical dipoles symmetrically disposed around a central axis, a goniometer, means coupling the corresponding poles of the dipoles of each pair separately to the goniometer, a direction finding receiver coupled to the output of the goniometer, an indicator coupled to the output of the direction finding receiver, a transmission line transformer, a conductor coupling the other poles of the dipoles of one pair together and to said transformer, a transmission line phase-inverting transformer, a second conductor coupling the other poles of the dipoles of the other pair together and to said transmission line phase-inverting transformer, both of said transformers being coupled to ground to produce a transformation of the voltages in the dipoles with respect to ground, the phase-inverting transformer inverting the phase of said voltages with respect to ground and means for combining the outputs of said transformers with the output of said goniometer.

FRANK O. CHESUS.
FRANK G. THOMAS.

REFERENCES CITED

The following references are of record in the file of this patent:

UNITED STATES PATENTS

| Number | Name | Date |
| --- | --- | --- |
| 1,908,006 | Bellini | May 9, 1933 |
| 2,174,014 | Sullinger et al. | Sept. 26, 1939 |